United States Patent
Chaddock

(10) Patent No.: US 8,833,788 B2
(45) Date of Patent: Sep. 16, 2014

(54) TRAILER

(76) Inventor: Scott Chaddock, Seminole, FL (US)

( * ) Notice: Subject to any disclaimer, the term of this patent is extended or adjusted under 35 U.S.C. 154(b) by 140 days.

(21) Appl. No.: 13/161,592

(22) Filed: Jun. 16, 2011

(65) Prior Publication Data

US 2012/0319380 A1 Dec. 20, 2012

(51) Int. Cl.
| | |
|---|---|
| B62D 53/00 | (2006.01) |
| B60P 1/64 | (2006.01) |
| B60D 1/14 | (2006.01) |
| B60D 1/173 | (2006.01) |
| B60D 1/24 | (2006.01) |
| B62D 63/06 | (2006.01) |
| B62D 53/06 | (2006.01) |
| B60D 1/66 | (2006.01) |
| B62D 61/12 | (2006.01) |
| B62D 53/02 | (2006.01) |

(52) U.S. Cl.
CPC ............... B60D 1/665 (2013.01); B60D 1/143 (2013.01); B60D 1/173 (2013.01); B60D 1/247 (2013.01); B62D 63/061 (2013.01); B62D 53/065 (2013.01); B62D 61/12 (2013.01); B62D 53/02 (2013.01)
USPC ..................... 280/415.1; 280/414.5; 280/418; 280/418.1; 280/423.1; 280/463; 280/476.1; 414/476; 414/481

(58) Field of Classification Search
USPC ............... 280/276.1, 400, 405.1, 406.1, 407, 280/407.1, 414.5, 415.1, 416.1, 416.3, 418, 280/418.1, 423.1, 443, 444, 456.1, 460.1, 280/461.1, 462, 463, 476.1; 414/474, 476, 414/481, 482, 483, 484, 485
See application file for complete search history.

(56) References Cited

U.S. PATENT DOCUMENTS

| | | | | |
|---|---|---|---|---|
| 2,379,170 | A * | 6/1945 | McDaniel | 280/476.1 |
| 2,616,580 | A * | 11/1952 | Olson | 414/685 |
| 3,103,371 | A * | 9/1963 | Young | 280/414.1 |
| 3,429,585 | A * | 2/1969 | Ross | 280/441.2 |
| 3,697,098 | A * | 10/1972 | Fisher | 280/415.1 |
| 3,764,166 | A * | 10/1973 | Fiala | 280/441.2 |
| 3,866,947 | A * | 2/1975 | Yakubow | 280/441.2 |
| 4,050,598 | A * | 9/1977 | Schurz | 414/501 |
| 4,253,786 | A * | 3/1981 | Harkness | 414/24.5 |
| 4,266,795 | A * | 5/1981 | Walker | 280/402 |
| 4,412,768 | A * | 11/1983 | Bauer et al. | 414/24.5 |
| 4,427,211 | A * | 1/1984 | Bruna et al. | 280/402 |
| 5,232,393 | A * | 8/1993 | Brown | 446/434 |
| 5,348,333 | A * | 9/1994 | Gee | 280/491.5 |
| 5,662,450 | A * | 9/1997 | Roberts | 414/347 |
| 5,727,920 | A * | 3/1998 | Hull et al. | 414/476 |
| 5,775,713 | A * | 7/1998 | Peterson et al. | 280/441.2 |
| 6,065,621 | A * | 5/2000 | Fatemi et al. | 212/301 |
| 6,685,211 | B2 * | 2/2004 | Iles | 280/476.1 |
| 6,932,372 | B2 * | 8/2005 | French et al. | 280/417.1 |
| 7,326,022 | B2 * | 2/2008 | Brown et al. | 414/483 |
| 7,927,063 | B2 * | 4/2011 | Keenan et al. | 414/812 |
| 8,226,102 | B2 * | 7/2012 | Liu | 280/204 |
| 2003/0067138 | A1 * | 4/2003 | Kahmann | 280/415.1 |
| 2006/0175799 | A1 * | 8/2006 | Heynssens | 280/414.5 |

* cited by examiner

Primary Examiner — Joseph M Rocca
Assistant Examiner — Marc A Scharich
(74) Attorney, Agent, or Firm — Maxey Law Offices, PLLC; Stephen Lewellyn

(57) ABSTRACT

A trailer system or trailer includes a trailer body having one or more wheel axle assemblies underlying the trailer body at a rear portion. In the trailer system embodiment, included is a detachable trailer neck that has at least one swivel wheel assembly located at a rear portion of the neck. The swivel wheel assemblies can be lifted or lowered using hydraulic or air cylinders. The neck or tongue has a transversely oriented pivot joint with an adjustable tongue weight assembly using springs and an air or hydraulically operated cylinder to adjust tongue weight.

12 Claims, 13 Drawing Sheets

TRAILER

FIELD OF THE INVENTION

The invention relates to improvements in trailers and detachable trailer necks or trailer tongues.

BACKGROUND OF THE INVENTION

In prior art traditional detachable neck trailers, there is an axle in the far back and none in the front of the trailer bed. Because of this, approximately half of the towed weight is placed on the rear axle of the tow vehicle. This requires a heavy duty tow vehicle and a heavy duty 5th wheel or gooseneck connection. The front half of the trailer is supported by a single point at the hitch connection. Having axles at the front corners of the trailer as in the present invention would greatly increase stability of the tow vehicle as well as the tow behind trailer bed assembly. Further, the present invention would greatly reduce or eliminate the tongue weight. This gives you the option of using a much smaller tow vehicle. It also gives you the option of using a conventional "bumper pull" hitch connection.

SUMMARY OF THE INVENTION

Throughout the description of the present invention that follows, it is sufficient that the terms "trailer tongue", "trailer neck" and "trailer gooseneck" be used interchangeably and considered synonymous with each other. Similarly, the terms "swivel axle" and "caster axle" are to be used interchangeably and synonymous to each other.

For trailers with detachable necks, the trailer neck is attached to the main trailer body (trailer bed) by the connections. Such connections are known in the art but generally include a couple of pins from the trailer body end that insert into corresponding receivers at the back of the trailer neck. The final coupling is usually done with a mechanical slotted coupling similar to a $5^{th}$ wheel connection or a locking jaw. Typical mechanical coupling systems for detachable trailer necks and trailer body can be seen at Web sites such as www.pittstrailers.com, www.murraytrailer.com, and www.towmaster.com. The connections are generally manipulated using hydraulic systems. The trailer bodies typically have a normal, regular (fixed) rear axle or dual axle or triple axle at the rear of the trailer body where the spaced-apart wheels are follow wheels that do not swivel. As mentioned, these rear axles may be configured to have multiple tandem wheels on each axle.

Many detachable neck trailers use a hydraulic cylinder system that pushes off the tow vehicle to raise or lower the neck when it is detached. The system is used as a height adjustment for the trailer neck to connect and disconnect from the main trailer deck or body. A cylinder pushes off the frame of the tow vehicle. This setup would not be good for lifting anything other than the tongue itself. If any weight were added to the end of the tongue, damage to the tow vehicle would result or the tow truck may find itself doing a "wheelie." The present invention described below overcomes this problem and as a result, can lift a tremendous amount of weight because the weight is put on the front swivel axles which push off the ground and which are much closer to the lifting face of the neck.

The present invention provides two independent spaced-apart front swiveling (or castering) axles near the distal or rear end of the trailer neck. Each axle is mechanically engaged with a wheel assembly underlying the trailer neck. The combination axle and wheel assemblies are each adjustable in height to raise or lower the trailer neck back end using various means to accomplish this such as hydraulic pistons, air pistons, electrical or gas driven motors, etc. In a preferred embodiment, the height adjustment would be accomplished using hydraulic cylinders. If the one or more cylinders are partially extended while the neck is attached to the trailer body, the front of the trailer is raised for ground clearance.

Because the front axles are configured to be mounted near the back end of the trailer neck, they swivel freely along with the underlying attached wheel assemblies, and they do not interfere with the normal trailer "steering/tracking" provided by the fixed, non-swiveling, rigid, standard rear axle(s). Therefore, the trailer can be backed up easily, the same as you would back up a normal trailer. The swivel feature typically incorporates rotary bearings or slew ring or slewing bearings. The swivel wheel assemblies may also incorporate electrical brake systems or air brake systems. Such braking features are known in the art and need not be described herein.

The present invention further provides for means for pivoting a portion of the detachable trailer neck. Generally, a pivot point that runs transversely across the neck a predetermined distance in front of the swivel wheel assemblies, allows for hinging the rear portion of the neck. This pivot point on the tongue allows part of the tongue to pivot up and down. Without this feature, uneven ground could actually lift the rear axle of the tow vehicle off the ground and in other circumstances, uneven ground could actually lift the front axle of the tow vehicle off the ground.

The spaced-apart swivel wheels on the trailer neck or tongue can be retracted to lower the neck and trailer body so that the trailer body touches the ground surface by retracting the hydraulic cylinder. The locking mechanism that couples the neck to the trailer body can be disengaged and the tow vehicle and the disconnected neck can be driven away from the main trailer body for off-loading or on-loading objects. The tongue weight adjustment means described below serves to keep the tongue from tipping over by controlling the pivot point on the tongue.

In a preferred embodiment, the present invention provides for means for adjusting the tongue weight. This "tongue weight adjustment" can be accomplished in several ways but a preferred method is to provide a steel tube or rod that loosely passes through the neck near the front of the pivot point. The rod has end caps on either end with springs trapped between the tongue and the caps on both the upper and lower sides of the tongue. The springs act as shock absorbers. A hydraulic cylinder is attached to the rod which is used to increase or decrease the tongue weight put on the hitch of the tow vehicle. This setup allows the user to increase/decrease the tongue weight while still allowing for some upward and downward "play" while driving. The upper end of the hydraulic cylinder is fixed to a structural member that in turn is fixed to the neck on the other side of the pivot point, that is, the tongue weight adjustment structural support essentially straddles the pivot point. Another advantage of this feature is that a user would not need a tongue jack to remove the trailer from the hitch. Too much tongue weight is a problem, too little is a problem. Being able to control tongue weight improves the overall performance and handling the tow vehicle and trailer. Of course, it is understood that there may be one or more such tongue weight adjustment systems provided where they are spaced-apart along the hinge line.

In an alternative embodiment to that of the spaced-apart swivel wheels underlying the trailer neck, a single wheel assembly is provided at the proximate centerline of the trailer neck. And of course, the term "wheel assembly" when referring to the rear of the trailer body refers to single axle single wheel assemblies, dual tandem wheels on a single axle or multiple axle rear wheel systems with single wheels mounted to each end of each axle or tandem wheels mounted to each end of each axle. Similarly for the swivel wheel assemblies mounted to the trailer neck, the term "wheel assembly" generically is equivalent to include a single wheel or dual tandem wheels on each swivel axle.

When the trailer tongue is detached from the main trailer body, it could be difficult to steer since the front axles swivel. One option to stabilize the trailer neck for maneuverability is to provide for means to lock one or more of the swivel wheel assemblies rendering them rigid to serve as follow wheels. Another option is to provide a temporary adjustable bar between the trailer tongue and the tow vehicle. The addition of a second "receiver" on the tow vehicle and an adjustable bar which temporarily goes from this receiver to a fixed spot on the trailer neck to lock the neck in place would allow for normal steering of the trailer tongue. The neck is no longer able to pivot on the hitch. Because the neck is locked in place, and because the axles swivel like casters, the neck is now able to be steered. The neck is steered not as a trailer, but as an extension of the tow vehicle.

The invention further provides for means for attaching to an object being transported on a trailer body such as portable storage container. Although there are several means for providing this function, one preferred method is to provide for the addition of one or more "lifting arms" and chains. The lifting arm can be a structural member securely fixed to the trailer neck that extends a predetermined distance over the trailer body when the trailer body is coupled to the trailer neck. The lifting arm would have means for coupling to a mating coupling member on the object. This could be as simple as providing for an upwardly directed L-shaped structural member on the object and a downwardly directed L-shaped member at the distal end of the lifting arm structural member. Underlying the lifting arm is a predetermined length of chain that is fixed to an underside of the lifting arm structural member and a hook at the chain's opposite end where the hook engages a hook receptacle on the object at a location below and spaced-apart from the lifting arm engagement point on the object.

When the neck has been detached from the main trailer body and the lifting arm and chain are attached to an object such as a portable storage unit, the cylinders are extended to provide clearance between the bottom of the storage unit and the top of the trailer deck. The combination chain and lifting arm essentially act like a log turner tool. If wheels were also attached to the back of the object, in this example, a portable storage unit, you could now drive it off the front of the trailer body. The lifting cylinders further allow the user to keep the portable storage unit level at all times. Very little strain is put on the tow vehicle because the front swivel axles take the weight and because the tongue can pivot.

When the neck is detached from the trailer body, an additional optional feature is the addition of lifting "forks" that can be attached to the neck to turn the neck into a "tow behind forklift." There are many ways to attach forks, the easiest of which would be to manually push them into the recesses on the neck (the same ones that are used to connect the main trailer body). When the tongue is attached to the tow vehicle, but not attached to the main trailer body, the "tongue weight adjustment" could also serve as the fork "tilt" function, that is, it would serve the same purpose as the tilt function on a forklift. It serves as an additional control. You could angle the tongue (and thus the forks) forward or backward to assist with attaching to and lifting a variety of items.

Regular "wagon style" trailers are very stable because they do have an axle in the back and an axle in the front. However, this type of trailer has two pivot points, the tow vehicle hitch connection and the center of the front axle. Because there is a second pivot point, these types of trailers are almost impossible to back up. Also, because the front axle moves in unison or in synchronous fashion with the tongue, the front wheels are not always under the corners of the trailer bed which results in decreased stability. The present invention described above overcomes both of these problems.

In a more simplistic version of the invention, the invention can be applied to a basic trailer body where we are not dealing with a detachable trailer neck. In this embodiment, the tongue of the trailer body would still include the adjustable tongue weight feature with the transverse pivot point as described above. Front swivel wheels underlying the trailer body would be provided. These wheels could be adjustable in height as well or the tongue weight could be reduced using the adjustable tongue weight feature and then simply lifting the tongue off the tow vehicle hitch. A tongue jack would then not be needed.

DETAILED DESCRIPTION OF THE INVENTION

Figure 1:
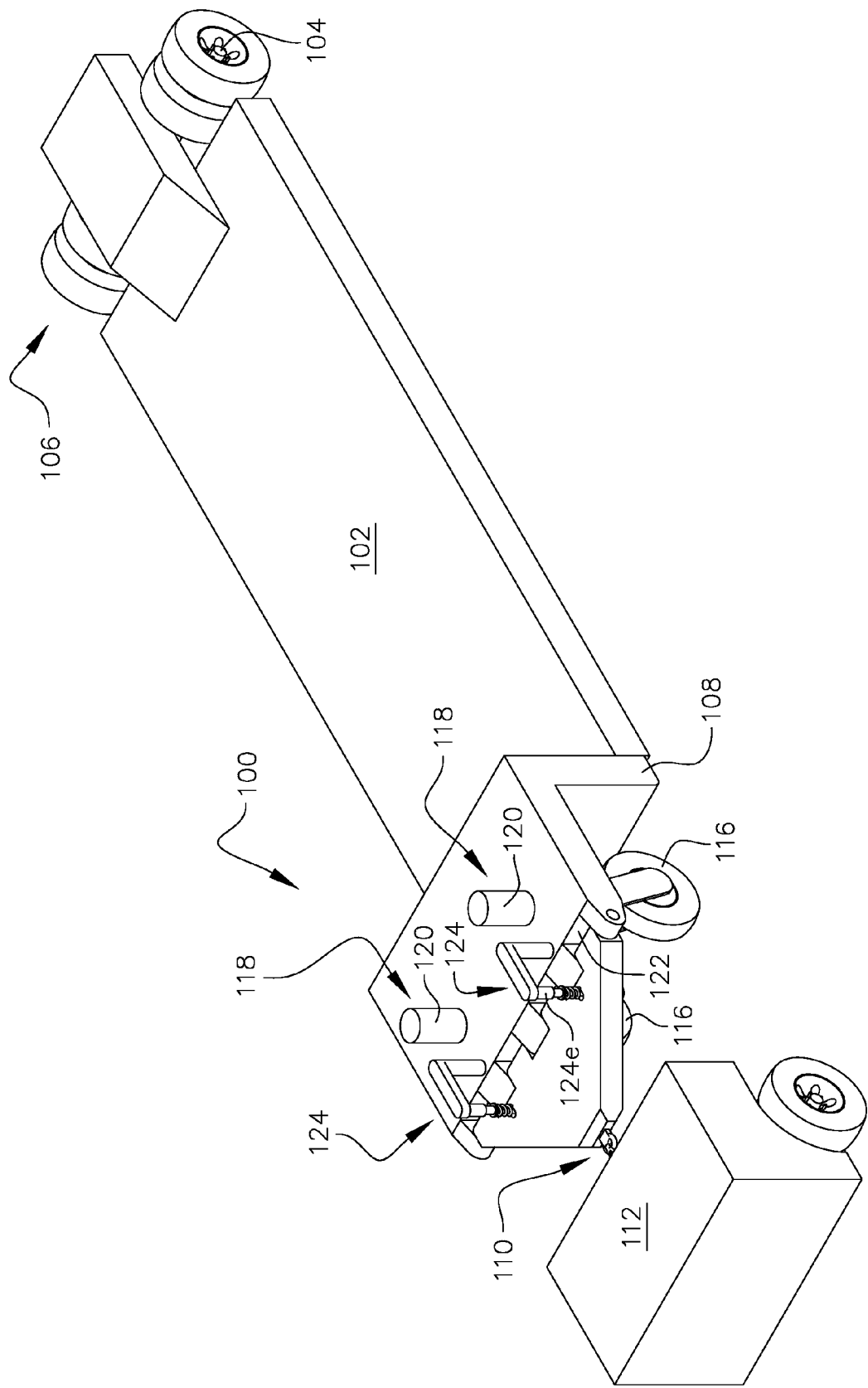
FIG. 1 is a perspective conceptual representational view of one embodiment of the invention.
Figure 2:
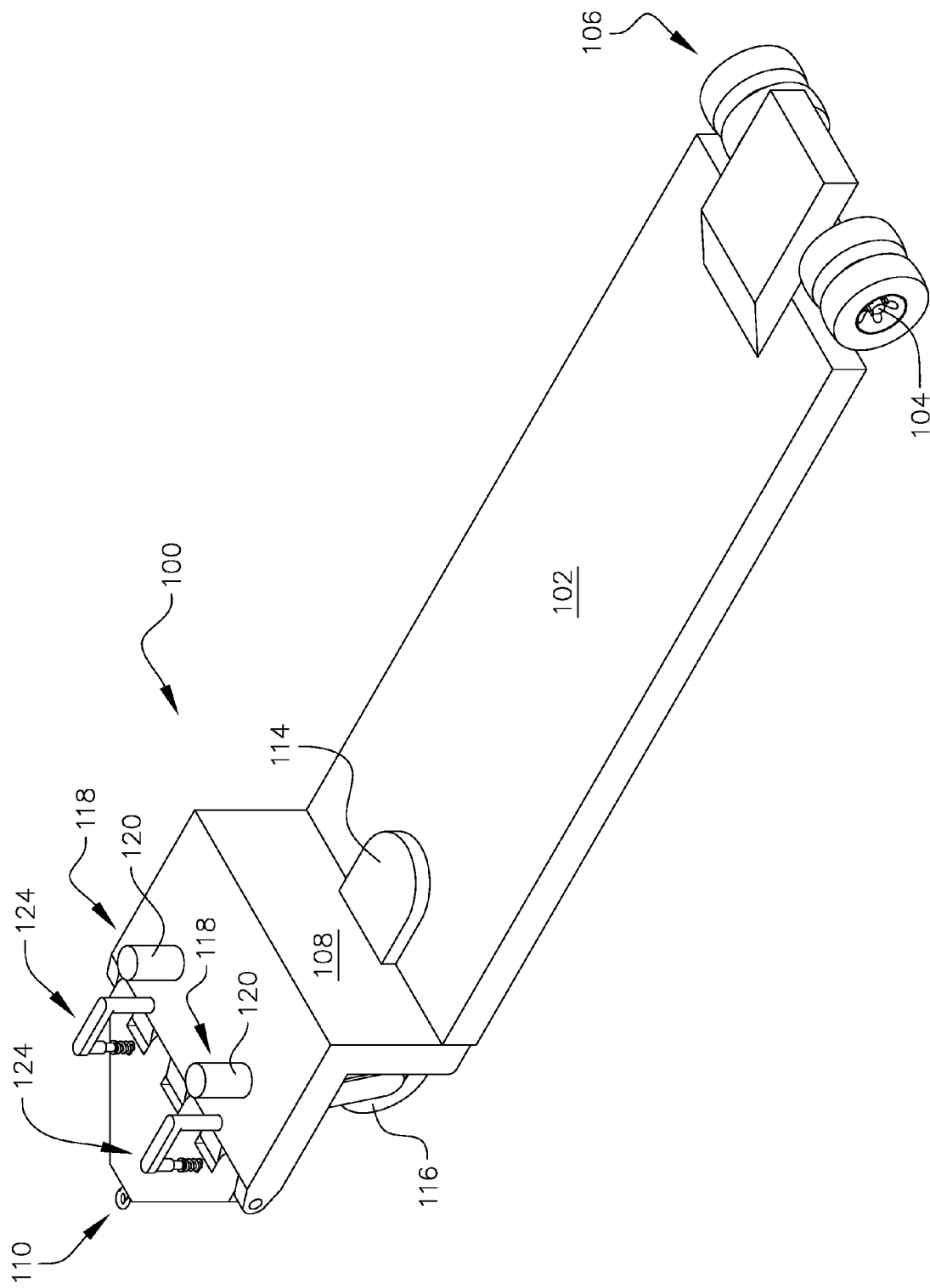
FIG. 2 is another perspective conceptual representational view of the embodiment of the invention shown in FIG. 1.
Figure 3:
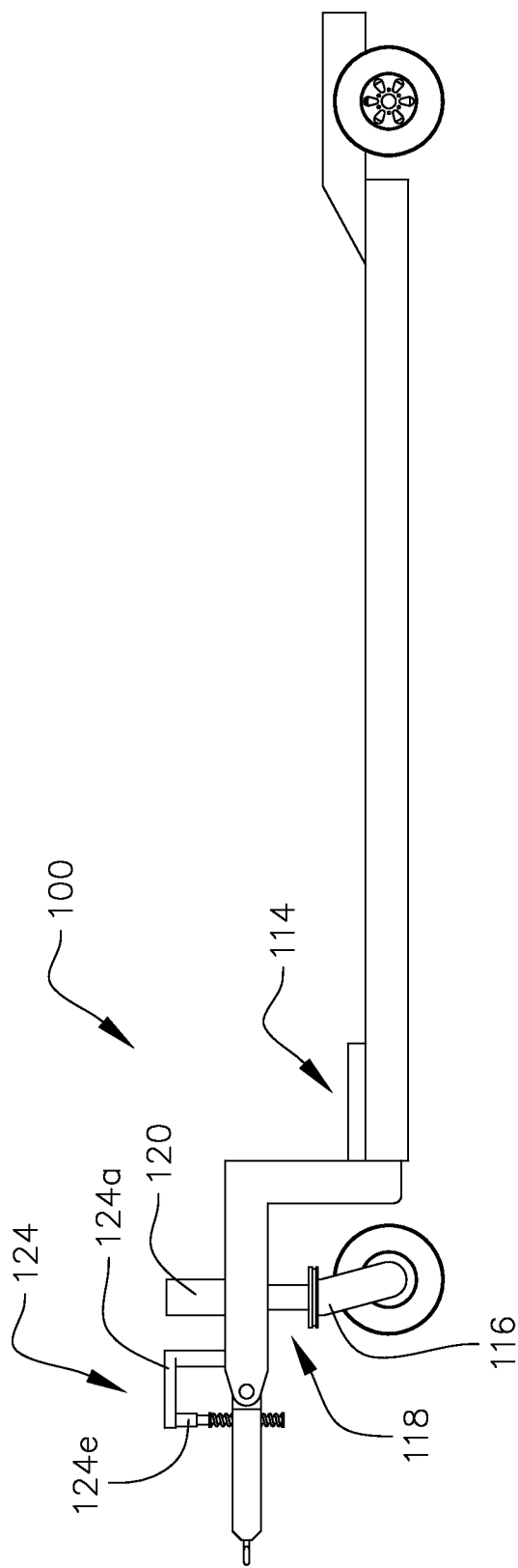
FIG. 3 is a side view of the invention shown in FIG. 1 with the one or more cylinders for lifting and lowering the trailer neck shown in an elevated position.
Figure 4:
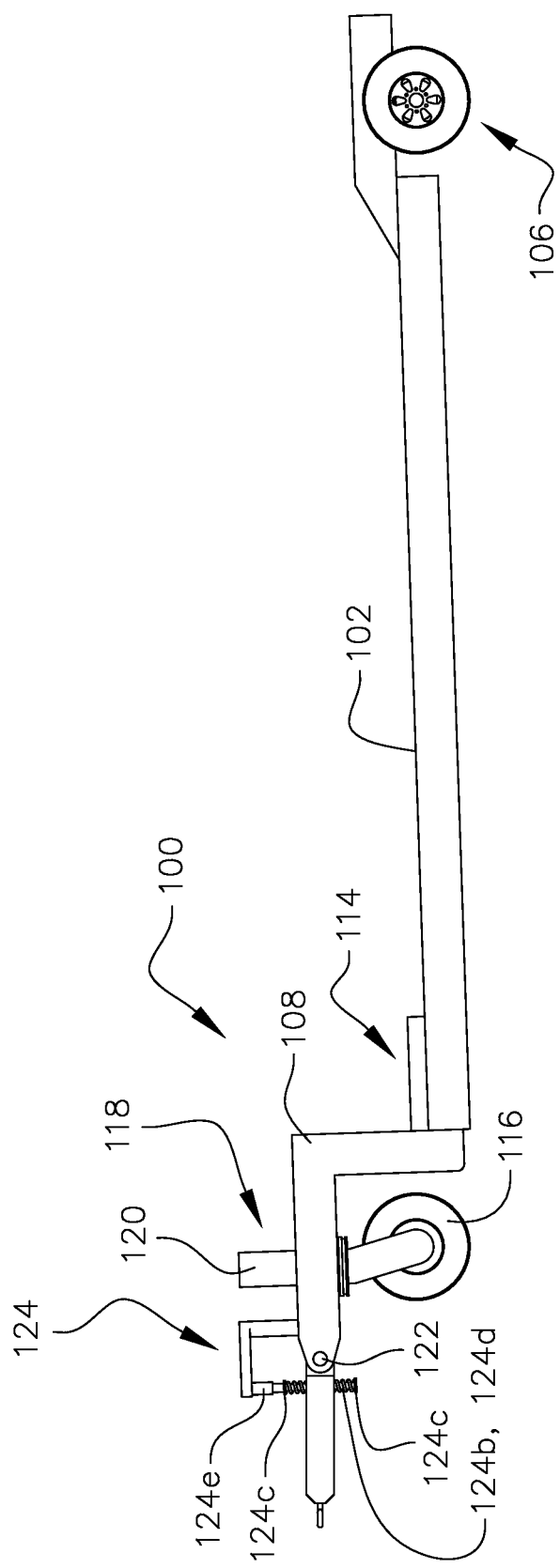
FIG. 4 is a side view of the invention shown in FIG. 1 with the one or more cylinders for lifting and lowering the trailer neck shown in a down position.
Figure 5:
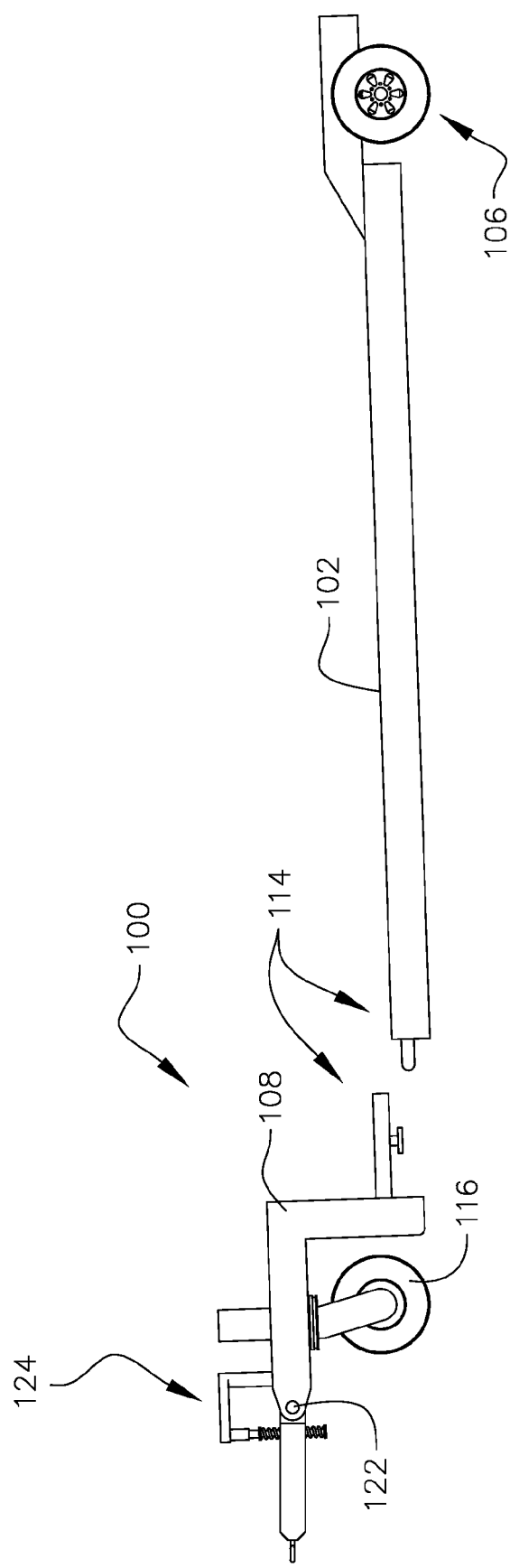
FIG. 5 is a side view of FIG. 4 with the neck detached from the trailer body.
Figure 6:
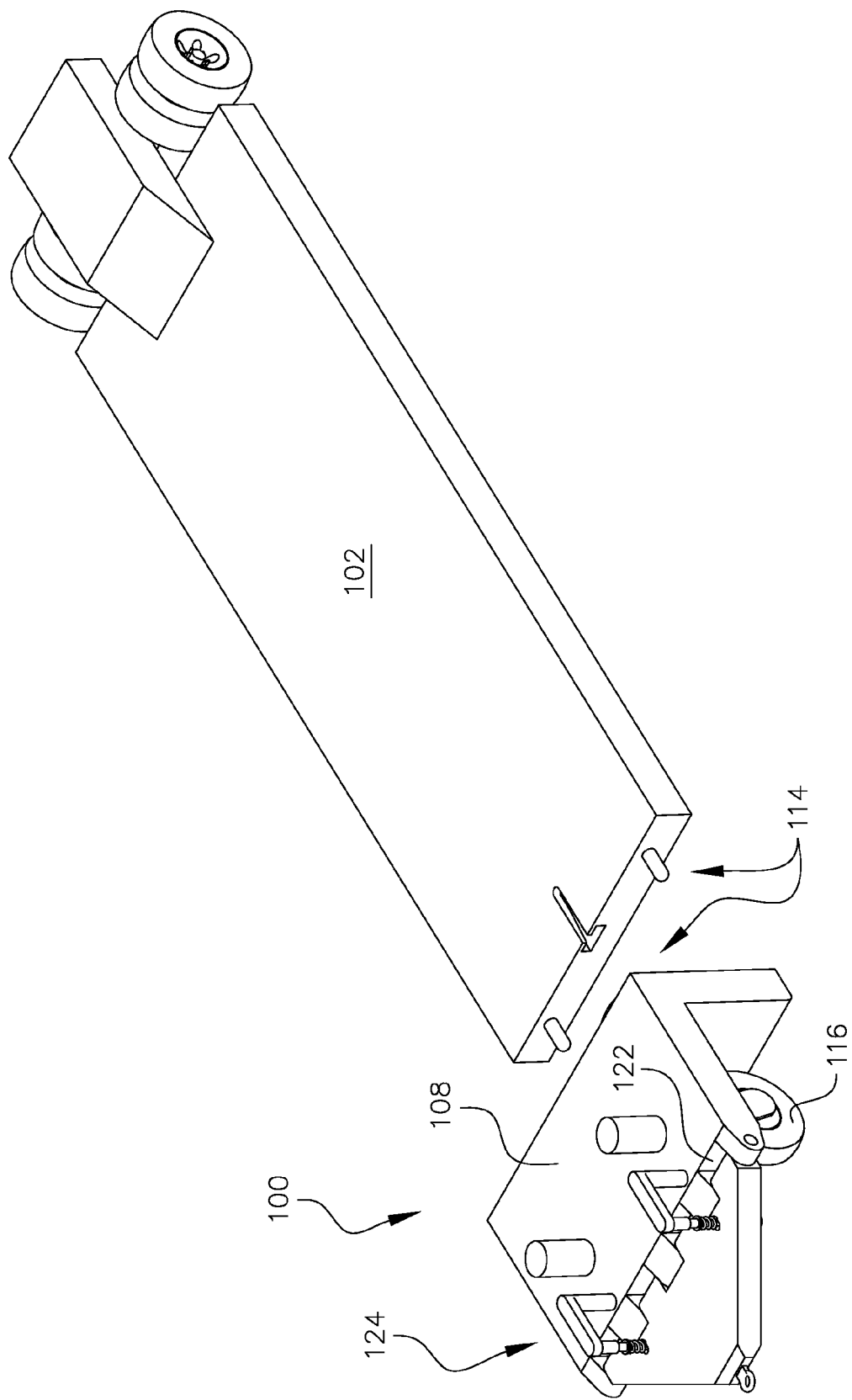
FIG. 6 is another perspective view of the invention of FIG. 1 with the trailer neck detached from the trailer body.
Figure 7:
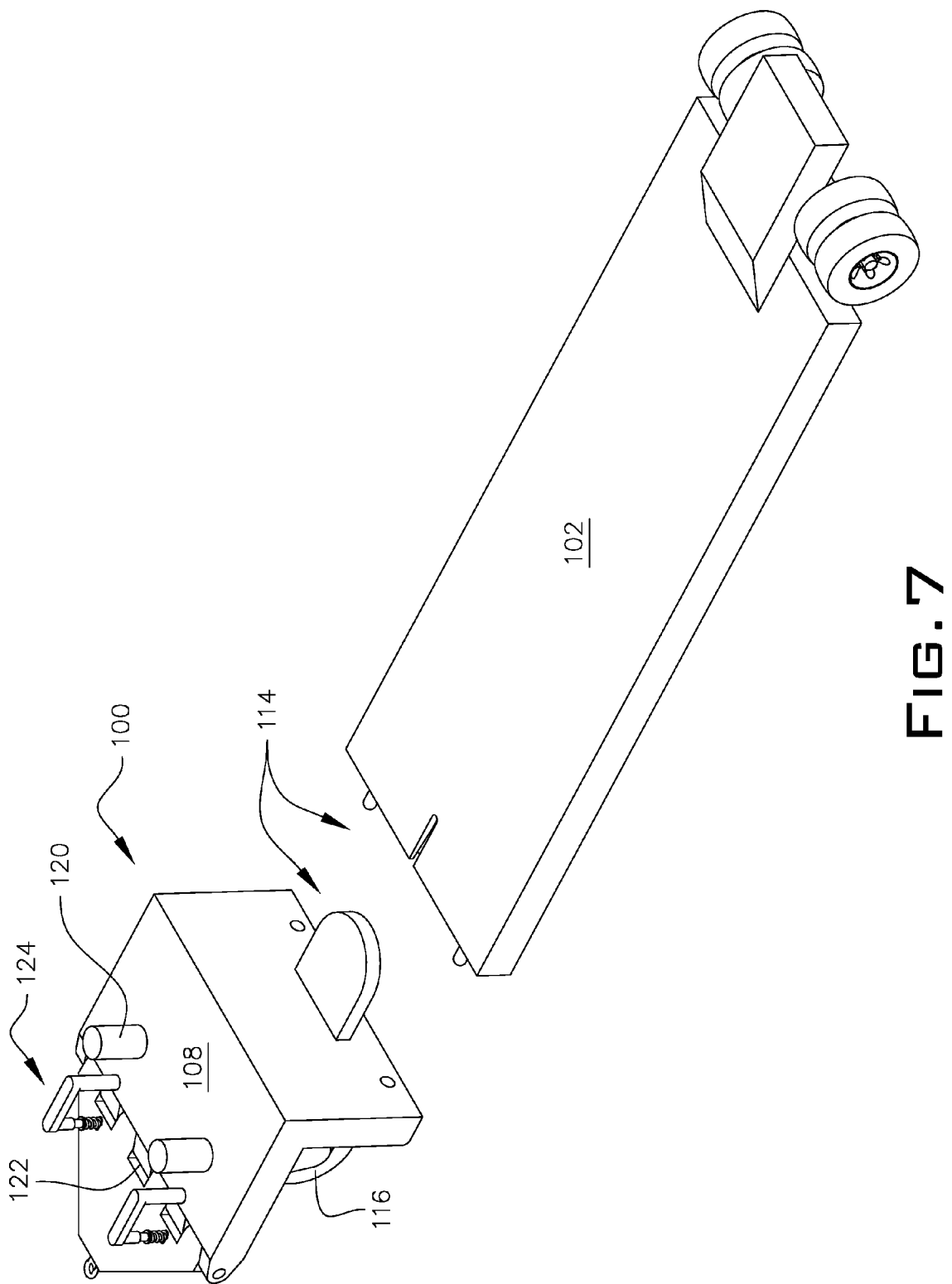
FIG. 7 is another perspective view of the invention shown in FIG. 2 with the trailer neck detached from the trailer body.
Figure 8:
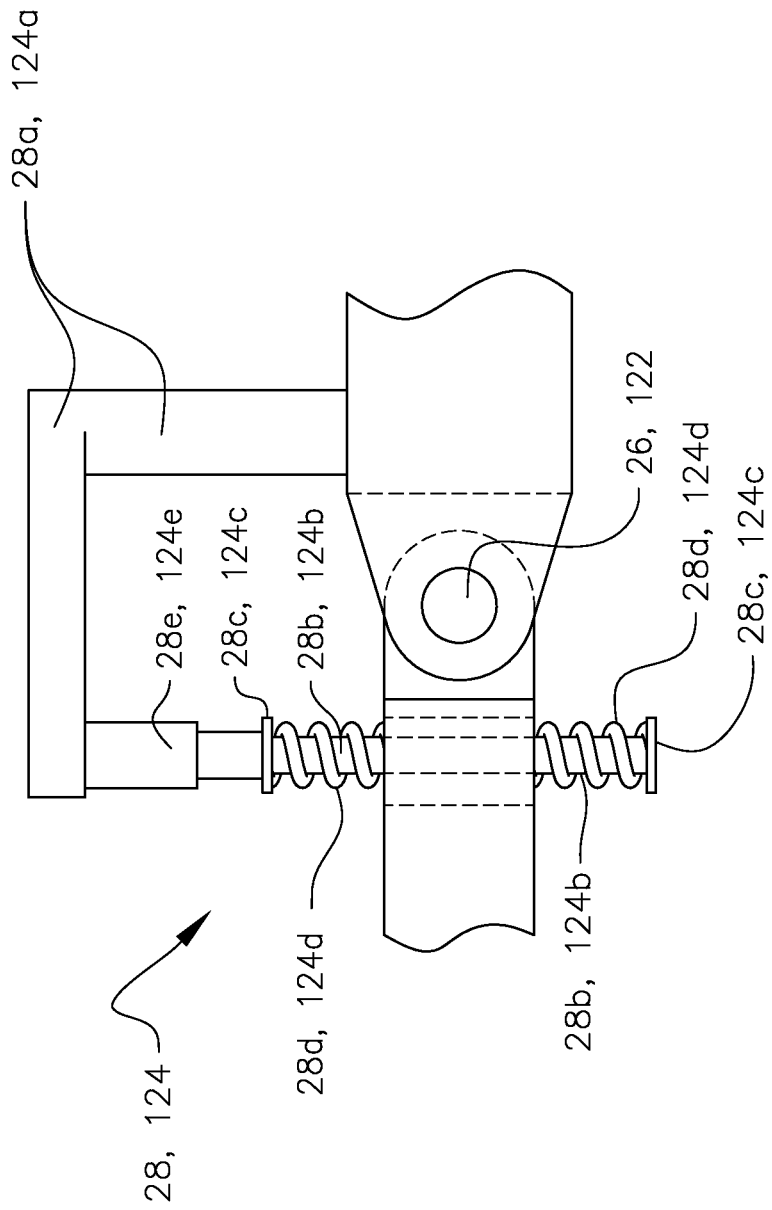
FIG. 8 is a conceptual view of one example of providing a means for adjusting a tongue weight that is applicable to the invention shown in FIG. 1 as well as the inventive embodiment depicted in FIG. 13 below.
Figure 9:
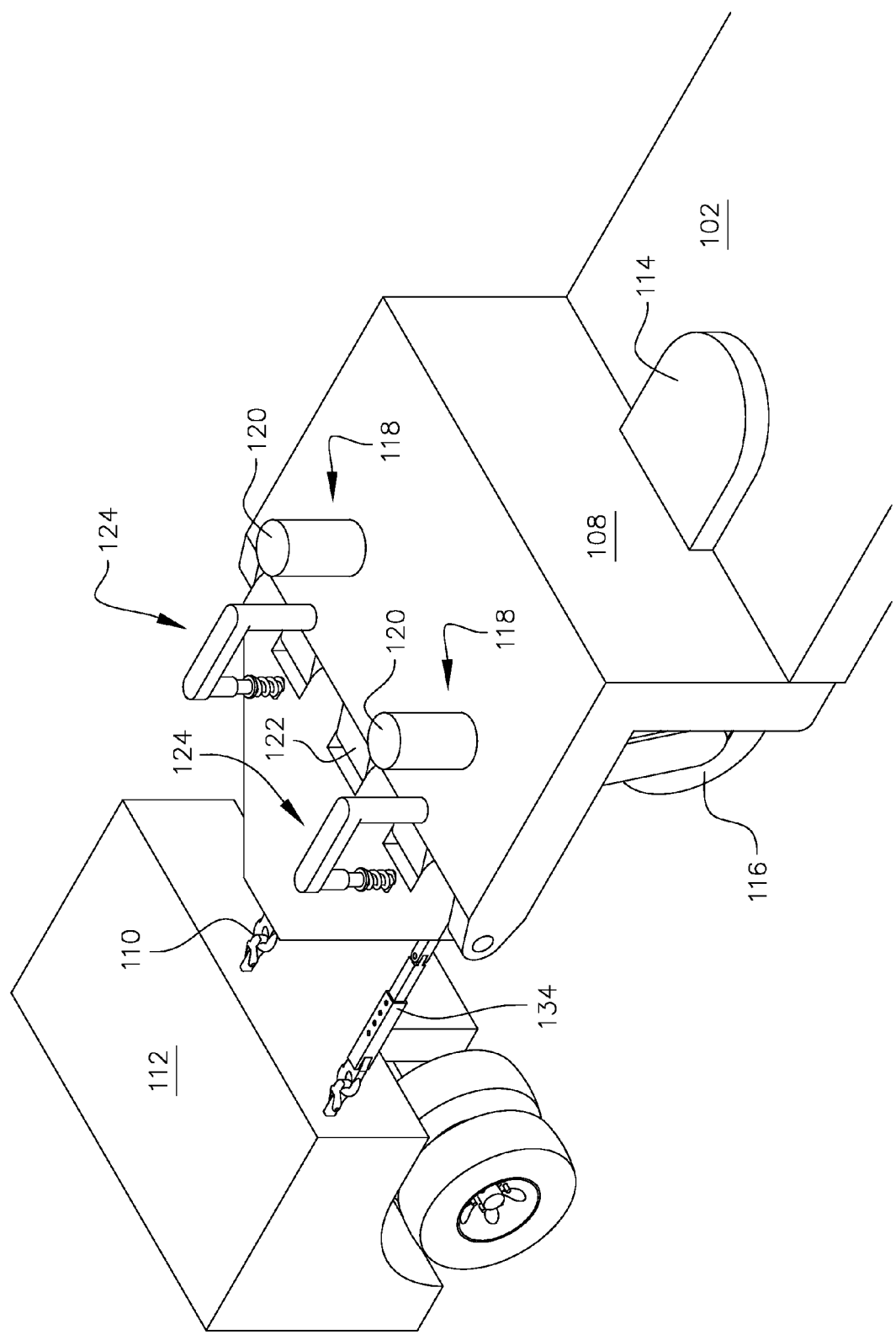
FIG. 9 is a conceptual depiction of the incorporation of an adjustable length bar between the tow vehicle and the detachable neck.
Figure 10:
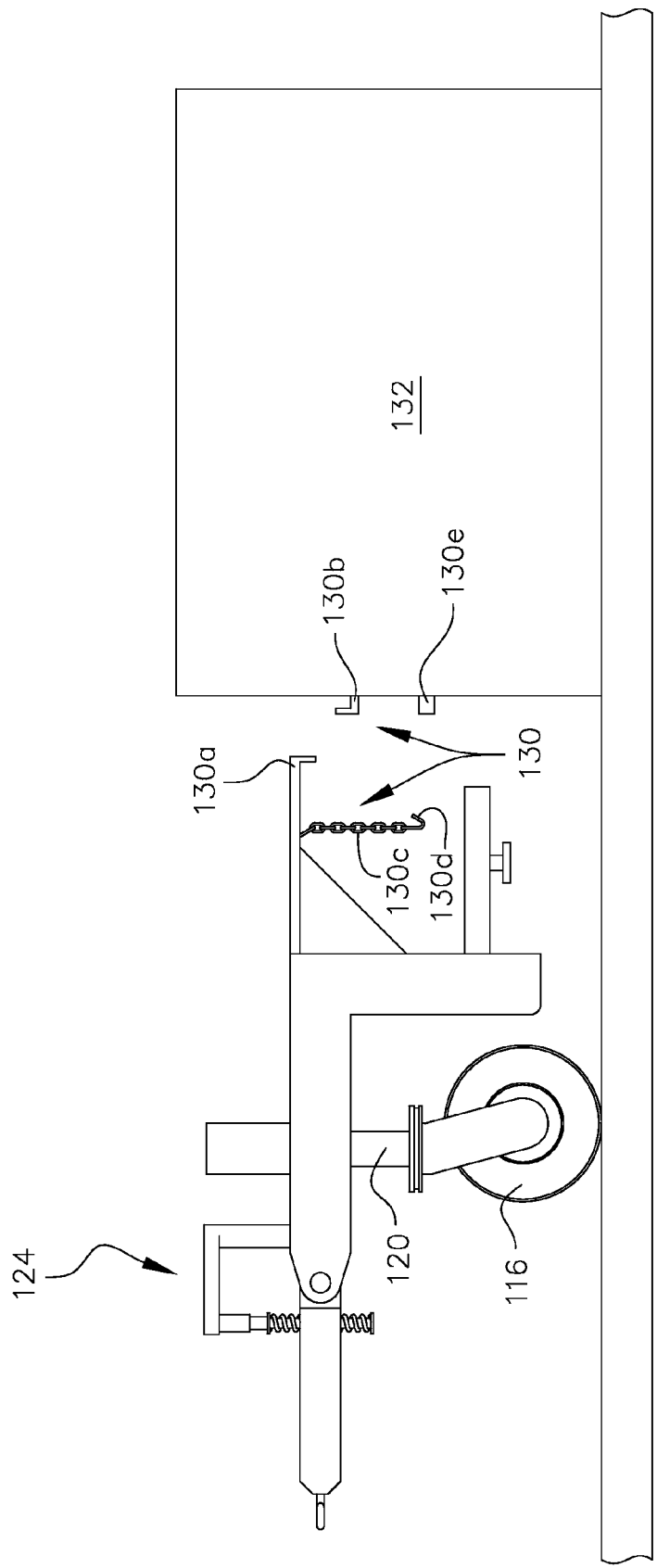
FIG. 10 is a conceptual exemplary depiction of one way to incorporate means for handling an object or container.
Figure 11:
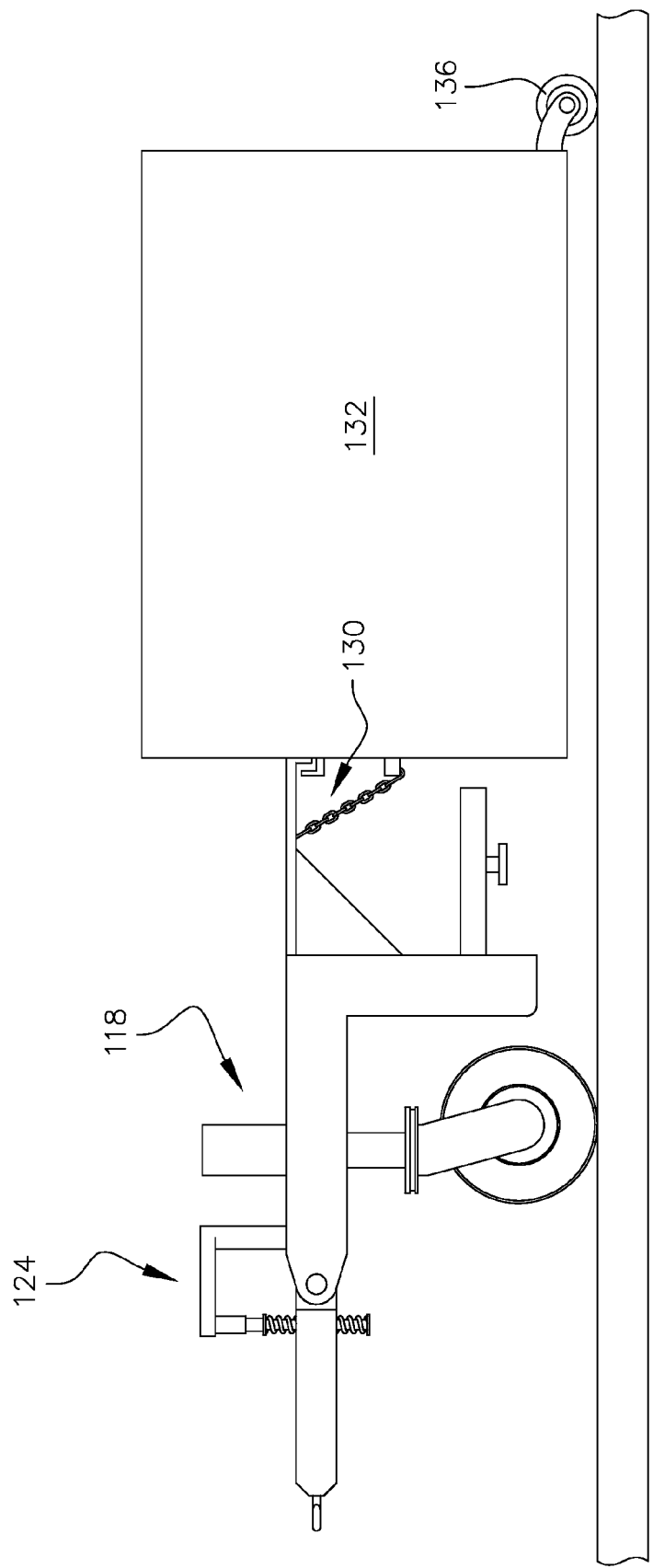
FIG. 11 is a depiction similar to FIG. 10 with the object or container attached to the means for handling the object or container.
Figure 12:
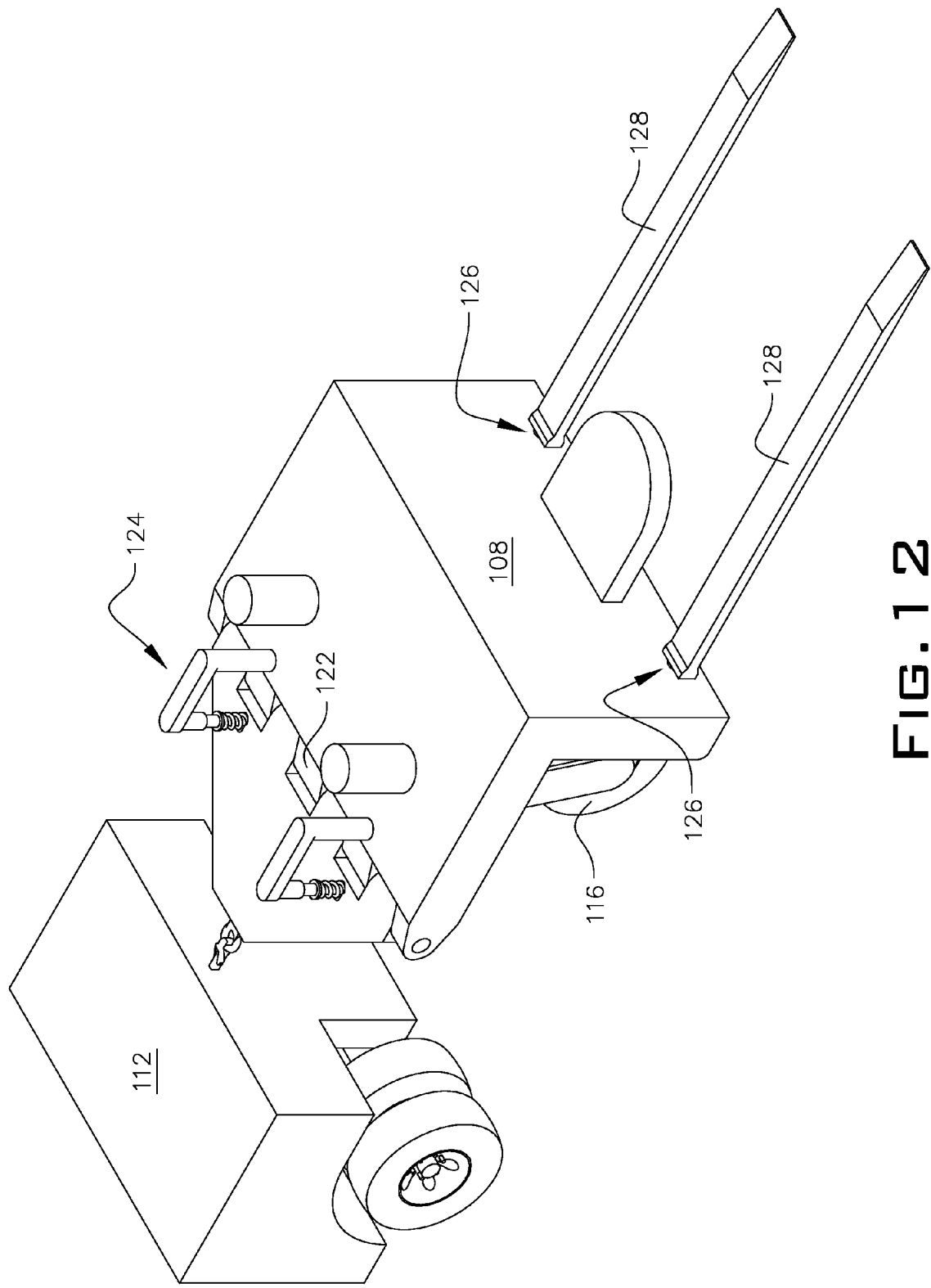
FIG. 12 is a conceptual depiction of the incorporation of fork lift blades to the detachable neck.
Figure 13:
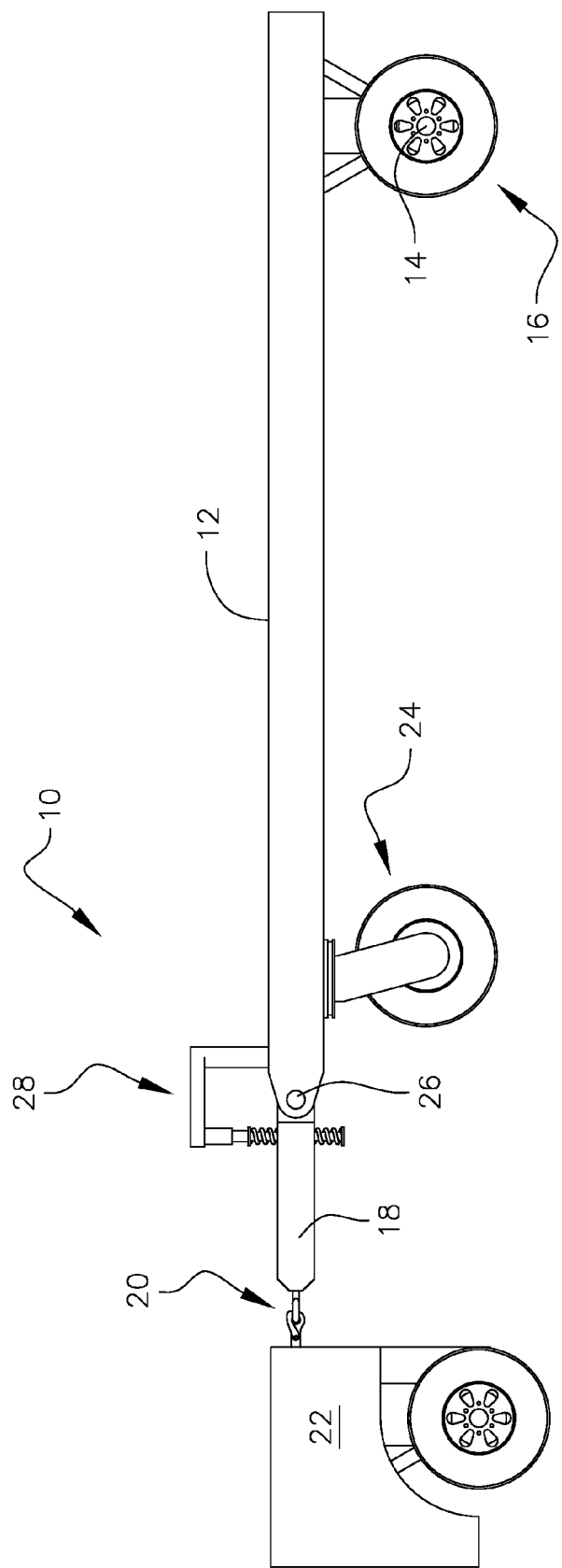
FIG. 13 is a conceptual representational view of another embodiment of the present invention.

Referring now to the drawings, FIGS. 1-12 disclose an example of one general embodiment of the present invention and FIGS. 8 and 13 disclose another general embodiment of the present invention, which is a trailer depicted generally as 10 in FIG. 13 and a trailer system depicted generally as 100 in the invention of FIGS. 1-12.

In the first general embodiment depicted in FIG. 13, the present invention is essentially a trailer 10 comprising a trailer body 12 having one or more axles 14 underlying the trailer body 12 at a rear portion of the trailer body 12 with a wheel assembly 16 at each end of the one or more axles 14. Although the drawings depict a single axle 14 at the rear of the trailer body 12, it is understood that depending on the load rating of the trailer body, two or three axles may be present and the wheel assemblies on each axle hub can be single wheels or tandem multiple wheel hub assemblies. Accordingly, the term "axles" above contemplates such multiple axle systems and such multiple hub wheel systems.

The trailer body further comprises a trailer tongue portion 18 extending forward of the trailer body 12. The tongue portion 18 has means 20 for mechanically engaging a mating connection on a tow vehicle 22. There are many systems known in the art to make this connection to a tow vehicle. Examples of which are, but not limited to, standard ball and hitch connections and $5^{th}$ wheel connections, among many others.

The trailer 10 further includes at least one swivel wheel assembly 24 underlying the trailer body 12 at a front portion of the trailer body 12. The wheel assembly 24 is located a predetermined distance aft of the tongue portion 18. Again, the depicted drawings show a single wheel but it is understood that there could be two spaced-apart wheel assemblies 24 and that each wheel assembly could include a single wheel or a double hub two wheel assembly. The term "swivel wheel assembly" encompasses such multiple wheel assemblies.

The trailer further comprises means 26 for pivoting the tongue portion 18 upwardly or downwardly. The means 26 for pivoting the tongue portion 18 is transversely oriented across the tongue portion 18. This is essentially a hinge line, for which there are many ways to provide the hinging effect but one way is as depicted, that is a structure similar to a door or piano hinge.

The trailer 10 further comprises means 28 for adjusting a tongue weight. Such means 28 for adjusting a tongue weight can be provided in a number of ways but one rather simple preferred method as depicted in FIG. 8 is to provide a tongue weight adjustment structural support member 28a fixed to the tongue portion 18 on an aft side of the means 26 for pivoting the tongue portion 18. The tongue weight adjustment structural support member 28a extends upwardly and then horizontally forward above, across and forward of the means 26 for pivoting the tongue portion. A rod member 28b is configured to loosely pass through the tongue portion 18 at a location forward of the means 26 for pivoting the tongue portion 18. End caps 28c are located on each end of the rod member 28b and a spring member 28d is helically installed along the rod member 28b between each of the end caps 28c and the tongue portion 18. A cylinder 28e, which can be hydraulically or pneumatically operated, is provided. One end of the cylinder 28e, typically the piston end, is connected to an upper end of the rod member 28b. An opposite end of the cylinder 28e is connected to the tongue weight adjustment structural support member 28a overlying the rod member 28b. It is understood that one or more such adjustment systems can be provided along the hinge line.

In another embodiment depicted generally in FIGS. 1-12, the present invention is a trailer system 100. The trailer system 100 comprises a trailer body 102 having one or more axles 104 underlying the trailer body 102 at a rear portion of the trailer body 102 with a wheel assembly 106 at each end of the one or more axles 104. As previously discussed for the earlier described embodiment, it is understood that depending on the load rating of the trailer body, two or three axles may be present and the wheel assemblies on each axle hub can be single wheels or tandem multiple wheel hub assemblies. Accordingly, the term "axles" above contemplates such multiple axle systems and such multiple hub wheel systems.

The trailer system 100 further comprises a trailer neck 108, which may be detachable from the trailer body. As referred to hereinafter, neck 108 and detachable neck 108 are to be considered synonymous or otherwise interchangeable. The neck 108 has means 110 for mechanically engaging a mating connection on a tow vehicle 112. There are many systems known in the art to make this connection to a tow vehicle. Examples of which are, but not limited to, standard ball and hitch connections and $5^{th}$ wheel connections, among many others.

The neck 108 further has means 114 for mechanically engaging a front end of the trailer body 102. As described earlier, for trailers with detachable necks, the trailer neck 108 is attached to the main trailer body 102 (trailer bed) by the mechanical connections. Such connections are known in the art but generally include a couple of pins from the trailer body end that insert into corresponding receivers at the back of the trailer neck 108. The final coupling is usually done with a mechanical slotted coupling similar to a $5^{th}$ wheel connection or a locking jaw. Typical mechanical coupling systems for detachable trailer necks and trailer body can be seen at Web sites such as www.pittstrailers.com, www.murraytrailer.com, www.pittstrailers.com, and www.towmaster.com. The connections are generally manipulated using hydraulic systems.

The neck 108 has at least one swivel wheel assembly 116 located at a rear portion of the neck 108. Again, the depicted drawings show a single wheel assembly 116 but it is understood that there could be two spaced-apart wheel assemblies 116 and that each wheel assembly 116 could include a single wheel or a double hub two wheel assembly. The term "swivel wheel assembly" encompasses such multiple wheel assemblies.

This embodiment further comprises means 118 for lifting and lowering said at least one swivel wheel assembly 116. By way of example only, the means 118 for lifting and lowering the at least one swivel wheel assembly 116 may comprise a cylinder 120 that is pneumatically or hydraulically operated.

The trailer system 100 further comprises means 122 for pivoting the neck 108 upwardly or downwardly, where the means 122 is transversely oriented across the neck 108. This is essentially a hinge line, for which there are many ways to provide the hinging effect but one way is as depicted, that is a structure similar to a door or piano hinge.

The trailer system 100 further comprises means 124 for adjusting a tongue weight. Such means 124 for adjusting a tongue weight can be provided in a number of ways but one rather simple preferred method as depicted in FIG. 8 is to provide at least one tongue weight adjustment system, each of which comprises a tongue weight adjustment structural support member 124a fixed to the neck 108 on an aft side of the means 122 for pivoting the neck 108. The tongue weight adjustment structural support member 124a extends upwardly and then horizontally forward above, across and forward of the means 122 for pivoting the neck 108. A rod member 124b is configured to loosely pass through the neck 108 at a location forward of the means 122 for pivoting the neck 108. End caps 124c are located on each end of the rod member 124b and a spring member 124d is helically installed along the rod member 124b between each of the end caps 124c and the neck 108. A cylinder 124e, which can be hydraulically or pneumatically operated, is provided. One end of the cylinder 124e, typically the piston end, is connected to an upper end of the rod member 124b. An opposite end of the cylinder 124e is connected to the tongue weight adjustment structural support member 124a overlying the rod member 124b. It is understood that one or more such adjustment systems can be provided along the hinge line.

The trailer system 100 may optionally further comprise means 126 for temporarily attaching spaced-apart forks 128 at the rear portion of the neck 108 to allow the neck 108 to be used as a forklift for handling objects 132. There are several ways known in the art to provide for receptacles in a frame structure of a body such as a detachable neck 108, where the back end of individual forks 128 can be inserted and locked into position. Given the frame structure at the back end of the tow vehicle, one skilled in the art can easily modify the frame structure to secure the forks. This is done frequently with bucket loaders which are modified to attach forks so the bucket loader can be used as a fork lift. Further, many forklifts for instances have the ability to swap out forks with longer ones or shorter ones where such designs can be incorporated into the back end of a neck.

In an optional embodiment, the trailer system 100 further comprises means 130 for mechanically engaging, lifting and handling an object 132 that is being transported on the trailer body 102. One preferred method of providing such means 130 is to provide for one or more object lifting systems 130, each of which comprises an upwardly directed L-shaped structural member 130b on the object 132 and a downwardly directed L-shaped member 130a at the distal end of the neck 108. A predetermined length of chain 130c that is fixed on one end to an underside of the downwardly directed L-shaped member 130a at the distal end of the neck 108 and a hook 130d at the chain's opposite end wherein the hook 130d is configured for engaging a mating hook receptacle 130e on the object 132 at a location below and spaced-apart from said upwardly directed L-shaped structural member 130b on the object 132. It is anticipated that in most cases the object 132 will be a portable storage container. A container could include one or more wheels 136 on the back of the container 132 to roll the container in position.

It may be advantageous that the at least one swivel wheel assembly 116 be lockable to prevent the wheel assembly from swiveling when desired.

Another advantageous option for the trailer system 100 is to provide a temporary adjustable in length bar 134 that include means for connecting one end of the bar 134 to the tow vehicle 112, and an opposite end of the bar 134 with means for connecting the bar 134 to said neck 108. The addition of a second "receiver" on the tow vehicle and an adjustable bar which temporarily goes from this receiver to a fixed spot on the trailer neck to lock the neck in place would allow for normal steering of the trailer tongue. The neck is no longer able to pivot on the hitch. Because the neck is locked in place, and because the axles swivel like casters, the neck is now able to be steered. The neck is steered not as a trailer, but as an extension of the tow vehicle.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A detachable neck trailer system comprising:
   a trailer body having one or more axles attached to a rear end of said trailer body and a ground engaging wheel assembly at each end of said one or more axles;
   a trailer neck removably coupleable to a forward end of said trailer body, said trailer neck having a coupling operable to detachably connect said trailer neck to a mating connection on a tow vehicle;
   at least one trailer neck ground engaging wheel assembly attached to said trailer neck and providing wheelable support to said trailer neck;
   means for lifting and lowering said at least one trailer neck ground engaging wheel assembly; and
   means for temporarily attaching spaced-apart forks at a rear portion of said trailer neck to allow the trailer neck to be used as a forklift for handling objects.

2. The detachable neck trailer system of claim 1, wherein said at least one trailer neck ground engaging wheel assembly is a swiveling wheel assembly.

3. The detachable neck trailer system of claim 1, wherein said at least one trailer neck ground engaging wheel assembly is a non-swiveling wheel assembly.

4. A detachable neck trailer system comprising:
   a trailer body having one or more axles attached to a rear end of said trailer body and a ground engaging wheel assembly at each end of said one or more axles;
   a trailer neck removably coupleable to a forward end of said trailer body, said trailer neck having a coupling operable to detachably connected said trailer neck to a mating connection on a tow vehicle;
   at least one trailer neck ground engaging wheel assembly attached to said trailer neck and providing wheelable support to said trailer neck when said trailer neck is disconnected from said mating connection;
   means for lifting and lowering said at least one trailer neck ground engaging wheel assembly; and
   means for temporarily attaching spaced-apart forks at a rear portion of said trailer neck to allow the trailer neck to be used as a forklift for handling objects.

5. A trailer system comprising:
   a trailer body having one or more axles underlying said trailer body at a rear portion of said trailer body with a wheel assembly at each end of said one or more axles;
   a detachable trailer neck located forward of said trailer body, said detachable trailer neck having means for mechanically engaging a mating connection on a tow vehicle;
   said detachable trailer neck having at least one swivel wheel assembly located at a rear portion of said detachable trailer neck;
   said detachable trailer neck having means for mechanically engaging a front end of said trailer body;
   said detachable trailer neck having means for lifting and lowering said at least one swivel wheel assembly; and
   means for temporarily attaching spaced-apart forks at said rear portion of said detachable trailer neck to allow the detachable trailer neck to be used as a forklift for handling objects.

6. The trailer system according to claim 5, further comprising
   means for pivoting said detachable trailer neck upwardly or downwardly, said means for pivoting said detachable trailer neck being transversely oriented across said detachable trailer neck.

7. The trailer system according to claim 6, further comprising means for adjusting a tongue weight of said detachable trailer neck.

8. The trailer system according to claim 7, wherein said means for adjusting a tongue weight of said detachable trailer neck comprises at least one tongue weight adjustment system comprising: a tongue weight adjustment structural support member fixed to said detachable trailer neck on an aft side of said means for pivoting said detachable trailer neck, said tongue weight adjustment structural support member extending upwardly and horizontally forward of said means for pivoting said detachable trailer neck; a rod member configured to pass through said detachable trailer neck at a location forward of said means for pivoting said detachable trailer neck; end caps located on each end of said rod member; a spring member being helically installed along said rod member between each of said end caps and said detachable trailer neck; and a cylinder, one end of which is connected to an upper end of said rod member, an opposite end of said cylinder being connected to said tongue weight adjustment structural support member overlying said rod member, said cylinder being configured to be one of pneumatically operated or hydraulically operated.

9. The trailer system according to claim 5, wherein said means for lifting and lowering said at least one swivel wheel assembly comprises a cylinder that is air or hydraulically operated.

10. The trailer system according to claim 5, wherein at least one of said objects to be handled is a portable storage container.

11. The trailer system according to claim 5, wherein said at least one swivel wheel assembly is selectively lockable to prevent said at least one swivel wheel assembly from swiveling.

12. The trailer system according to claim 5, further comprising a temporary adjustable-length bar having means for connecting one end of said bar to said tow vehicle, and an opposite end of said bar having means for connecting said bar to said detachable trailer neck.

\* \* \* \* \*